United States Patent
Jacobsen

(10) Patent No.: US 9,926,199 B1
(45) Date of Patent: Mar. 27, 2018

(54) ORDERED OPEN-CELLULAR CARBON MICROSTRUCTURE AND METHOD OF MAKING SAME

(71) Applicant: HRL LABORATORIES, LLC, Malibu, CA (US)

(72) Inventor: Alan J. Jacobsen, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1214 days.

(21) Appl. No.: 14/041,756

(22) Filed: Sep. 30, 2013

Related U.S. Application Data

(62) Division of application No. 11/870,379, filed on Oct. 10, 2007, now Pat. No. 8,585,944.

(60) Provisional application No. 60/946,480, filed on Jun. 27, 2007.

(51) Int. Cl.
*B29D 11/00* (2006.01)
*C01B 31/00* (2006.01)

(52) U.S. Cl.
CPC .................................. *C01B 31/00* (2013.01)

(58) Field of Classification Search
CPC ...... G02B 6/12002; G02B 6/138; G02B 6/10; B29D 11/0063; B32B 3/26; C04B 35/524; C04B 38/0022
USPC ............. 264/1.24; 52/633; 428/315.5, 315.7, 428/316.6, 315.9; 385/129, 130, 131
See application file for complete search history.

(56) References Cited

U.S. PATENT DOCUMENTS

| 3,395,970 | A | 8/1968 | Machell |
| 3,575,943 | A | 4/1971 | van der Loos |
| 4,022,875 | A | 5/1977 | Vinton et al. |
| 5,300,272 | A | 4/1994 | Simandl et al. |
| 6,500,401 | B2 | 12/2002 | Reznek et al. |
| 6,670,039 | B1 | 12/2003 | Nagle et al. |
| 8,197,930 | B1* | 6/2012 | Jacobsen ............... G02B 6/138 385/129 |
| 2007/0277704 | A1* | 12/2007 | Lucas .................. C04B 35/524 106/472 |

* cited by examiner

*Primary Examiner* — Camie S Thompson
(74) *Attorney, Agent, or Firm* — Lewis Roca Rothgerber Christie, LLP

(57) ABSTRACT

An ordered open-cellular carbon microstructure and a methods for forming the ordered open-cellular carbon microstructure capable of greatly improving the carbon yield (remaining mass % after carbonization) of an open-cellular polymer material. In one embodiment, the method starts with providing an ordered open-cellular polymer template material. The polymer template material is immersed in a reservoir containing a liquid monomer solution, wherein the liquid monomer solution swells the polymer material. Then the polymer template material is removed from the reservoir containing liquid monomer solution. Excess liquid monomer solution is removed from the polymer template material. The liquid monomer solution absorbed into the polymer template material is polymerized forming a copolymer material by irradiating the template material with ultraviolet (UV) light in a nitrogen environment. The copolymer material is heated in an inert atmosphere, wherein the copolymer material is carbonized resulting in the ordered open-cellular carbon microstructure.

6 Claims, 5 Drawing Sheets

US 9,926,199 B1

ORDERED OPEN-CELLULAR CARBON MICROSTRUCTURE AND METHOD OF MAKING SAME

CROSS-REFERENCE TO RELATED APPLICATION(S)

This application is a divisional of U.S. patent application Ser. No. 11/870,379, filed Oct. 10, 2007, entitled "Ordered Open-Cellular Carbon Microstructure and Method of Making Same," which claims priority to and the benefit of U.S. Provisional Application No. 60/946,480, filed on Jun. 27, 2007, entitled "Ordered Open-Cellular Carbon Microstructure And Method Of Making Same." The entire contents of both of the above-referenced applications are incorporated herein by reference.

FIELD OF THE INVENTION

The present invention relates to an ordered open-cellular carbon microstructure and a method of making the same. In particular, the present invention relates to an ordered open-cellular carbon microstructure created from a low-carbon yielding polymer template material.

BACKGROUND OF THE INVENTION

A number of techniques exist to create open-cellular carbon foams. These techniques include the pyrolization of a polymer foam (yielding what is termed a reticulated carbon foam), chemical vapor deposition of a carbon species on a foam substrate, and the direct carbonization of a natural material such as wood. None of these techniques, however, can create an open-cellular carbon material with an ordered microstructure.

Another method of carbonizing cellulose-containing plants is disclosed in Nagle, et al., "Carbonized Wood And Materials Formed Therefrom," U.S. Pat. No. 6,670,039, which is incorporated by reference herein in its entirety. The Nagle, et al. patent discloses that carbon foam derived directly from the carbonization of a polymer must utilize a high-cross link polymer to adequately carbonize.

An example of a carbon foam made from pyrolyzable substance to obtain carbon foam is disclosed in Reznek, et al., "Carbon Foams And Methods Of Making The Same," U.S. Pat. No. 6,500,401, which is incorporated by reference herein in its entirety. However, the Reznek et al. patent does not disclose an open-cellular carbon material with an ordered microstructure.

Another method of forming vitreous carbon foams from flexible polyurethane foams is disclosed in Vinton et al, "Method For The Preparation Of Vitreous Carbon Foams," U.S. Pat. No. 4,022,875, which is incorporated by reference herein by its entirety. However, the Vinton et al. patent does not disclose an open-cellular carbon material with an ordered microstructure.

A method of forming a macroporous vitreous carbon is disclosed in Gilberte Moutaud et al., "Process For The Manufacture of Macroporous Vitreous Carbon," U.S. Pat. No. 3,446,593, which is incorporated by reference herein by its entirety. The Gilberte Moutaud et al. patent does not disclose a method to create an open-cellular carbon material with an ordered microstructure.

As such, there continues to be a need for an open-cellular carbon material with an ordered microstructure and the method creating the same.

SUMMARY OF THE INVENTION

An aspect of an embodiment of the present invention is directed towards a method for forming an ordered open-cellular carbon microstructure.

Another aspect of an embodiment of the present invention is directed towards an ordered open-cellular carbon microstructure.

In an embodiment of the present invention, a method for forming an ordered open-cellular carbon microstructure is provided. The method includes: providing an ordered open-cellular polymer template material, the polymer template material including an interconnected pattern of polymer waveguides; immersing the polymer template material in a reservoir containing a liquid monomer solution; swelling the polymer template material with the liquid monomer solution; removing the polymer template material from the reservoir containing the liquid monomer solution; removing excess liquid monomer solution from the polymer template material; polymerizing the liquid monomer solution diffused into the polymer template material to form an ordered open-cellular polymer material; heating the ordered open-cellular polymer material in an inert atmosphere to carbonize the ordered open-cellular polymer material to result in the ordered open-cellular carbon microstructure.

In one embodiment of the method, the polymer template material is a polyurethane material.

In one embodiment of the method, the liquid monomer solution includes acrylonitrile. The liquid monomer solution may also include a free radical initiator to polymerize the liquid monomer solution. The free radical initiator may be utilized to polymerize the liquid monomer solution in response to ultraviolet (UV) light. The step of polymerizing the liquid monomer solution may include irradiating the polymer template material with UV light. The polymerizing of the liquid monomer solution may occur in a nitrogen environment.

In one embodiment of the method, the step of polymerizing the liquid monomer solution includes polymerizing the liquid monomer solution at a temperature ranging from about 200° C. to about 400° C.

In one embodiment of the method, the step of polymerizing the liquid monomer solution includes polymerizing the liquid monomer solution at a temperature ranging from about 200° C. to about 300° C.

In one embodiment of the method, the step of heating the ordered open-cellular polymer material in the inert atmosphere includes heating the ordered open-cellular polymer material in the inert atmosphere to a temperature not less than 600° C.

In one embodiment of the method, the step of heating the ordered open-cellular polymer material in the inert atmosphere includes heating the ordered open-cellular polymer material in the inert atmosphere to a temperature not less than 800° C.

In one embodiment of the method, the ordered open-cellular polymer material includes a separate phase of polyacrylonitrile (PAN).

In one embodiment of the method, the ordered open-cellular polymer material includes a copolymer with the ordered open-cellular polymer template material.

In another embodiment of the present invention, a method for forming an ordered open-cellular carbon microstructure is provided. The method includes: providing an ordered open-cellular polymer template material, the polymer template material including an interconnected pattern of polymer waveguides, wherein the polymer template material is a polyurethane material; immersing the polymer template material in a reservoir containing a liquid monomer solution; swelling the polymer template material with the liquid monomer solution, wherein the monomer solution includes a free radical initiator, the free radical initiator being utilized to polymerize the liquid monomer solution in response to ultraviolet (UV) light; removing the polymer template material from reservoir containing the liquid monomer solution; removing excess liquid monomer solution from the polymer template material; polymerizing the liquid monomer solution diffused into the polymer template material to form an ordered open-cellular polymer material by irradiating the template material with UV light in a nitrogen environment; and heating the ordered open-cellular polymer material in an inert atmosphere to carbonize the ordered open-cellular polymer material to result in the ordered open-cellular carbon microstructure.

In one embodiment of the method, the step of polymerizing the liquid monomer solution includes polymerizing the liquid monomer solution at a temperature ranging from about 200° C. to about 300° C., and the step of heating the ordered open-cellular polymer material in the inert atmosphere includes heating the ordered open-cellular polymer material in the inert atmosphere to a temperature not less than 800° C.

In one embodiment of the method, the liquid monomer solution includes acrylonitrile, and the ordered open-cellular polymer material includes a separate phase of polyacrylonitrile (PAN) or a copolymer with the ordered open-cellular polymer template material.

In another embodiment of the present invention, an ordered open-cellular carbon microstructure is provided. The ordered open-cellular carbon microstructure includes: a plurality of first carbonized truss elements extending along a first direction; a plurality of second carbonized truss elements extending along a second direction; and a plurality of third carbonized truss elements extending along a third direction, wherein the first, second, and third carbonized truss elements interpenetrate each other at a plurality of nodes to form a continuous material, and wherein the ordered open-cellular carbon microstructure is self-supporting.

In one embodiment of the ordered open-cellular carbon microstructure, the first, second, and third carbonized truss elements are defined by a plurality of polymer waveguides interconnected to each other as an ordered open-cellular polymer template.

In one embodiment of the ordered open-cellular carbon microstructure, the continuous material substantially lacks interior boundaries.

In one embodiment of the ordered open-cellular carbon microstructure, the first, second, and third carbonized truss elements are adapted to axially transfer a mechanical load applied to the ordered open-cellular carbon microstructure.

In one embodiment of the ordered open-cellular carbon microstructure, the plurality of first carbonized truss elements, the plurality of second carbonized truss elements, and the plurality of third carbonized truss elements include a carbonized polyacrylonitrile (PAN) material.

In one embodiment of the ordered open-cellular carbon microstructure, the plurality of first carbonized truss elements, the plurality of second carbonized truss elements, and the plurality of third carbonized truss elements include a carbonized copolymer of polyurethane.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Further, the dimensions of layers and other elements shown in the accompanying drawings may be exaggerated to more clearly show details. As such, the drawings and description are to be regarded as illustrative in nature and not restrictive.

Embodiments of the present invention relate to ordered open-cellular carbon microstructures and methods to produce such microstructures. Embodiments of the present invention can greatly improve the carbon yield (remaining mass % after carbonization) of an open-cellular polymer material.

During pyrolyzation, or carbonization of a polymer, volatile gases are released resulting in mass loss, most of which occurs below 1000° C. These gases release primarily hydrogen from the polymer (in addition to oxygen and nitrogen), and depending on the molecular structure, the material remaining after pyrolyzation or carbonization can be a stable form of carbon. A non-limiting example of a high carbon yielding polymer is polyacrylonitrile, which if properly oxidized before carbonization, can have a carbon yield greater than 50%.

Figure 1:
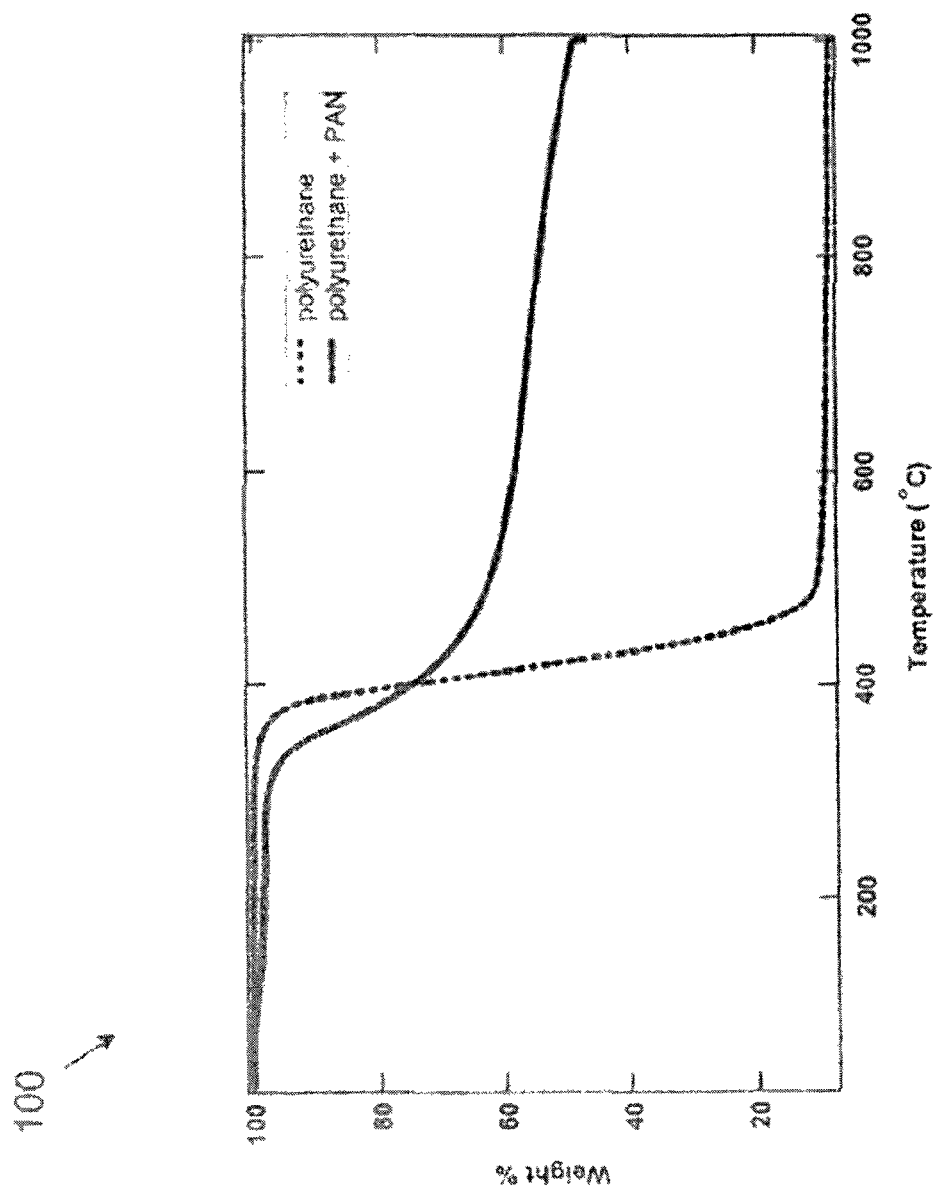
FIG. 1 is a graph illustrating carbon yield differences between two polymer formation samples as a function of temperature illustrating the benefit of including polyacrylonitrile with polyurethane.

Referring to FIG. 1, if the aim is to form a carbon structure from a polymer template material, a polymer is selected to provide satisfactory carbon yield; however, the formation process of an exemplary ordered open-cellular polymer microstructure (as described in U.S. patent application Ser. No. 11/580,335) may utilize specific polymer formulations that have an extremely low carbon yield (<10 mass %), when heated to carbonization temperatures higher than 600° C. (see graph 100 in FIG. 1). For this reason, embodiments of the present invention provide one or more processing steps to improve the carbon yield of the polymer material, thereby enabling formation of ordered open-cellular 3D carbon microstructures.

One embodiment of the present invention discloses a method for forming an ordered open-cellular carbon microstructure from a low carbon-yielding polymer template material (or template). Non-limiting examples of a low carbon-yielding polymer template material having an ordered open-cellular microstructure are disclosed in U.S. patent application Ser. No. 11/580,335, filed on Oct. 13, 2006, entitled "Optically Oriented Three-Dimensional Polymer Microstructures" and U.S. patent application Ser. No. 11/801,908, filed on May 10, 2007, entitled "Three-Dimensional Ordered Open-Cellular Structures." The entire contents of these two-referenced applications are incorporated herein by reference.

The method according to the present embodiment can greatly improve carbon yield. The method involves immersing the open-cellular polymer template material in a liquid monomer solution that will diffuse into and swell the polymer template material. The liquid monomer diffused into the polymer template material can be polymerized using either ultraviolet (UV) light or heat. The liquid monomer is selected to have a high carbon yield once polymerized. A non-limiting example of such high carbon yield monomer is acrylonitrile.

The open-cellular polymer template material acts as a template to absorb the liquid monomer while maintaining the open-cellular microstructure. The resulting polymerized open-cellular microstructure has substantially the same shape as the original polymer template structure; however, the structure can now be carbonized to form an open-cellular carbon microstructure with a high carbon yield. The form of the carbon formed can range from glassy carbon to graphitic carbon depending on the need of the final application.

Another embodiment of the present invention discloses an ordered open-cellular carbon microstructure created by the method disclosed in the above embodiment.

An exemplary ordered open-cellular carbon microstructure disclosed in the present invention can be useful in a wide range of applications, particularly in applications where heat and/or electrical conductivity in combination with structural integrity are required. The exemplary carbon microstructure disclosed provides a high strength/stiffness-to-weight ratio making it useful for composite structural applications, and the directional nature of the microstructure provides a preferential direction for thermal and electrical conductivity. In addition, the ordered open-cellular carbon microstructure can be easily tailored, providing a way to design the mechanical, as well as the thermal and electrical properties for specific applications.

Figure 2A:
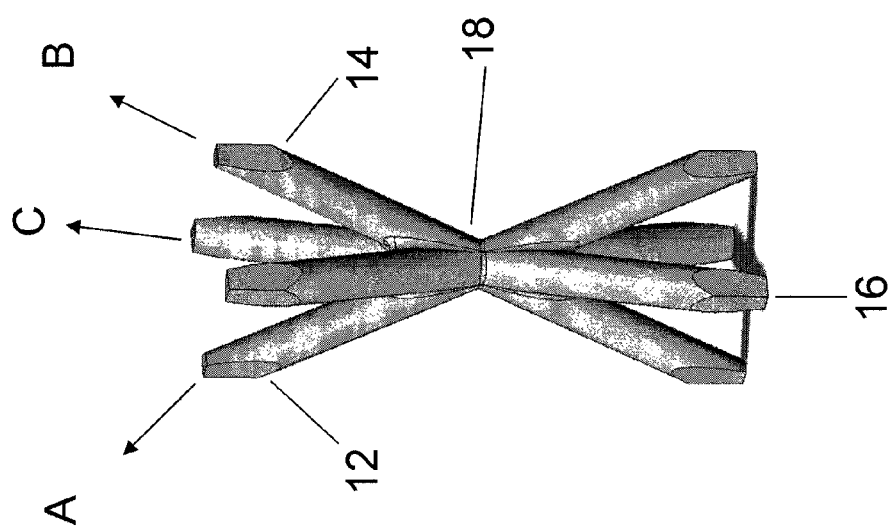
FIGS. 2a and 2b are schematic views illustrating a unit cell and an ordered microstructure in accordance with embodiments of the present invention.
Figure 2A:
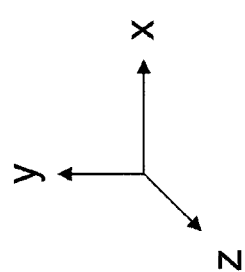
Figure 2B:
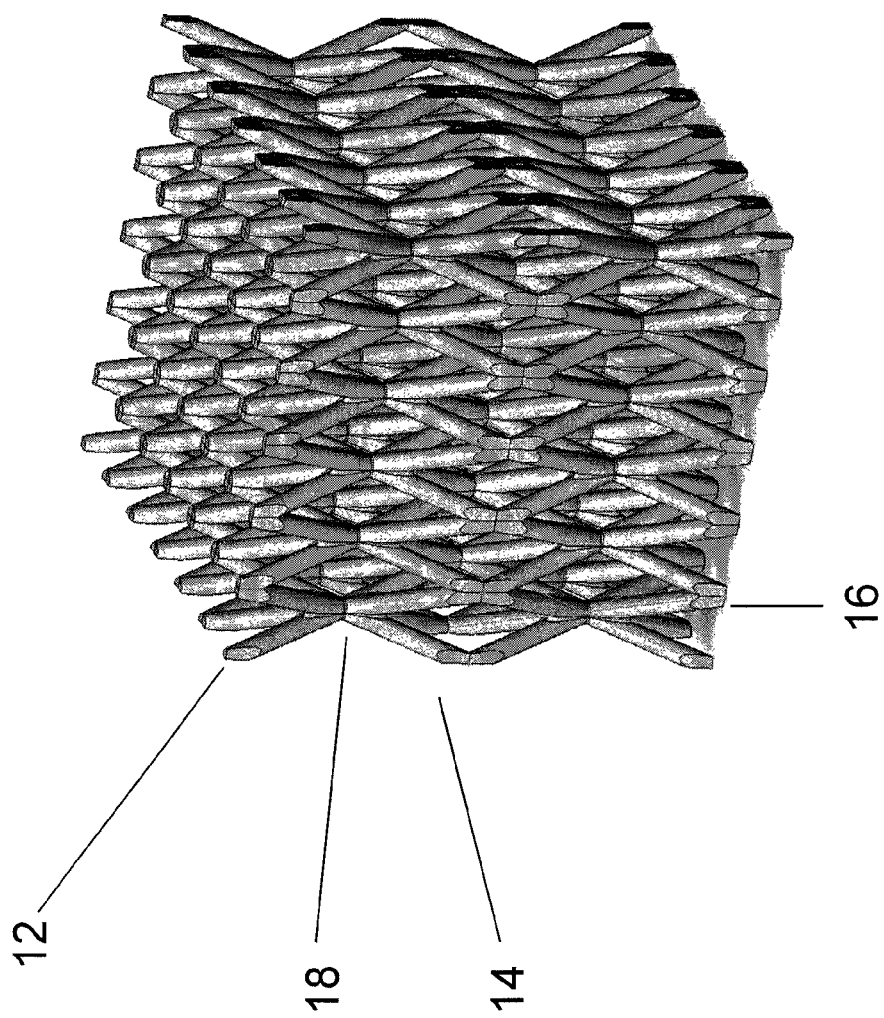

In one embodiment of the present invention, with reference to FIGS. 2a and 2b, a three-dimensional ordered open-cellular structure 10 (see FIG. 2b) is a self-supporting structure that is utilized as an ordered open-cellular polymer template material (or template). The structure 10 includes first truss elements 12, second truss elements 14, and third truss elements 16. The first truss elements 12 are defined by first self-propagating polymer waveguides and extend along a first direction A (see FIG. 2a). The second truss elements 14 are defined by second self-propagating polymer waveguides and extend along a second direction B (see FIG. 2a). The third truss elements 16 are defined by third self-propagating polymer waveguides and extend along a third direction C (see FIG. 2a). With reference to FIGS. 2a and 2b, the truss elements 12, 14, 16 interpenetrate each other at nodes 18 to form a continuous material.

In one embodiment, the truss elements 12, 14, 16 include a photo-polymer material. In one embodiment, the truss elements 12, 14, 16 are polymer optical waveguide truss elements.

In one embodiment, the continuous material is continuously formed such that it lacks any interior boundaries, e.g., boundaries within the interpenetrating portions of truss elements 12, 14, 16. In another embodiment, each node 18 of the structure 10 is formed of the continuous material.

According to one embodiment of the present invention, the structure 10 is formed by using a fixed light input (collimated UV light) to cure (polymerize) polymer optical waveguides, which can self-propagate in a 3D pattern. As such, the propagated polymer optical waveguides form the structure 10.

Figure 3:
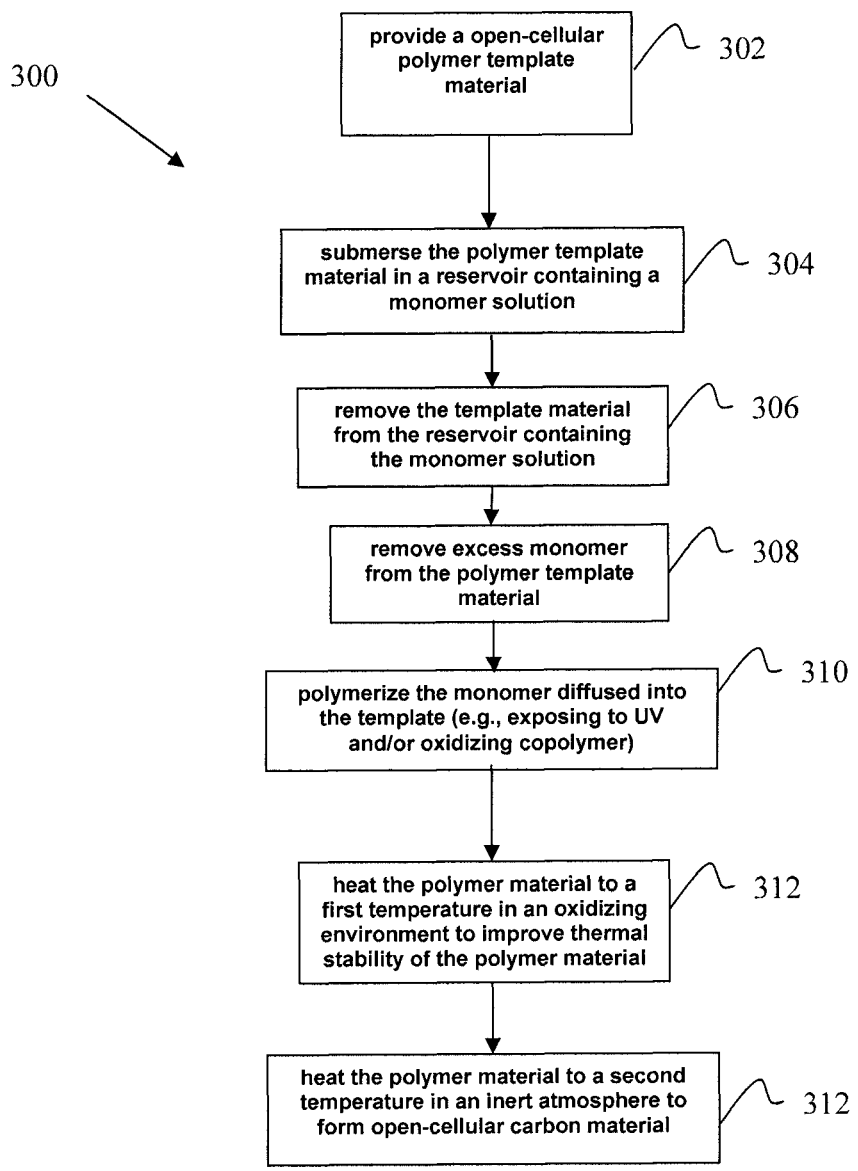
FIG. 3 is a flowchart of an exemplary method for forming an ordered open-cellular carbon microstructure in accordance with an embodiment of the present invention.

FIG. 3 illustrates an exemplary method 300 for forming an ordered open-cellular carbon microstructure from a low carbon-yielding polymer template material according to an embodiment of the present invention. In step 302 of the method 300, a low carbon-yielding polymer template material is provided. In step 304, the template material is submersed in a reservoir containing a liquid monomer solution. In one embodiment, the only requirement for these starting materials is the original open-cellular polymer template material must absorb the liquid monomer solution (or monomer) and this monomer, when polymerized, must have a higher carbon yield than the original polymer template material. In one embodiment, the open-cellular polymer template material is a polyurethane (not highly crosslinked) material, and the liquid monomer is acrylonitrile, which behaves as a solvent and swells the polyurethane indicating absorption. The acrylonitrile should also contain a small percentage (e.g., <5 wt. %) of a free radical initiator to polymerize the monomer. The initiator could generate free radicals to cause polymerization through either heat, such as 2,2'-azobis(isobutyronitrile), or UV light, such as 2,2-Dimethoxy-2-phenylacetophenone or benzoin methyl ether; however, in one embodiment of the present invention, a UV photo-initiator would be used. Exposing the swelled polyurethane to UV light is done in a nitrogen environment to inhibit oxygen scavenging of the free radicals during polymerization. The time required for polymerization can vary between seconds to minutes, as it depends on the intensity of the UV light, the cellular structure, and the amount of liquid monomer swelled into the polyurethane.

The open-cellular nature of the polymer structure has a high surface area-to-volume ratio, which provides an ideal template (or template material) to reduce diffusion time of the acrylonitrile into the polymer. After submersing the polymer template material in the acrylonitrile for enough time to ensure maximum absorption (generally>1 hr.) or swell, the open-cellular polyurethane is removed from the acrylonitrile in step 306 and the excess acrylonitrile is drained in step 308. The polymer material, now swelled with acrylonitrile and the appropriate initiator, is heated or placed under UV light (depending on the type of initiator used) to polymerize the acrylonitrile in step 310. The new open-cellular polymer may either contain a separate phase of polyacrylonitrile (PAN) or the acrylonitrile could form a copolymer with the original polymer material.

In step 312, the new open-cellular polymer material containing PAN or a copolymer of acrylonitrile is heated to a temperature ranging from about 200° C. to about 300° C. (or from about 200° C. to about 400° C. or from 200° C. to 300° C.), in an oxidizing environment (e.g., air) and held there for a period ranging from about 1 to about 5 hrs (or from 1 to 5 hrs). The cyclization reaction that occurs during this heat treatment is commonly used to improve the thermal stability of the polymer and thus the carbon yield.

In step 314, the stabilized (or oxidized) polymer is then heated to carbonizing temperatures that is higher than about 800° C. (or higher than about 600° C. or high than about 800° C.) in an inert atmosphere. The resulting carbon structure will depend on the maximum temperature reached and can range from glassy carbon to graphitic.

Figure 4B:
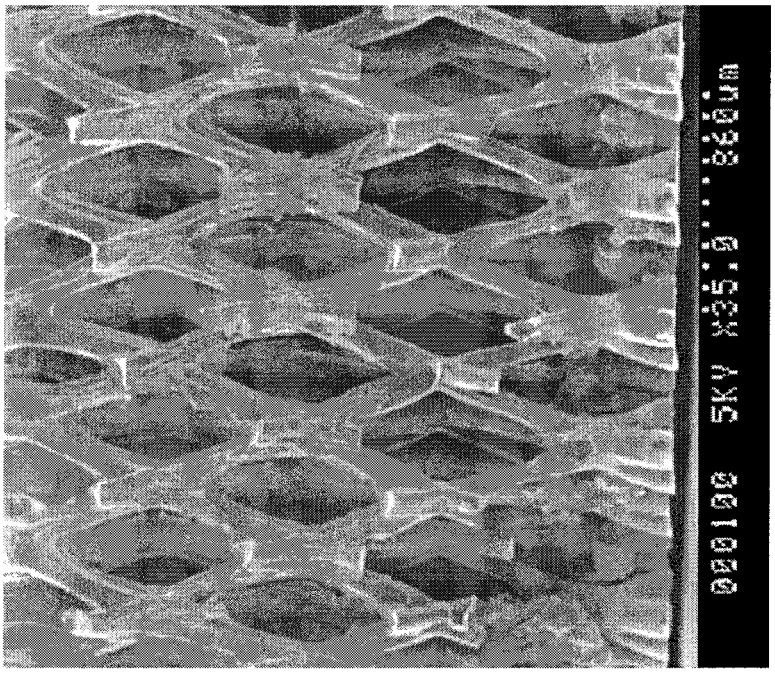
FIGS. 4a and 4b are scanning electron micrographs of an ordered open-cellular 3D carbon microstructure in accordance with embodiments of the present invention.
Figure 4A:
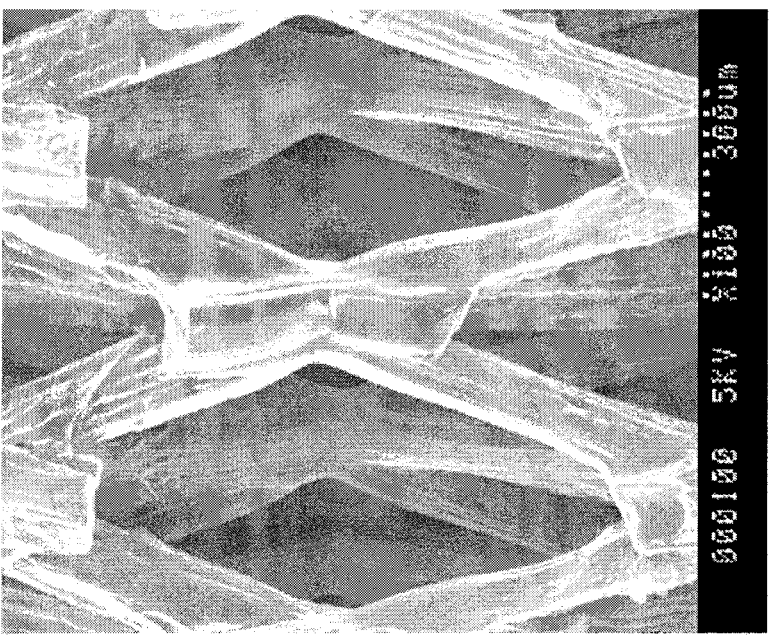

Scanning electron micrographs of an exemplary ordered open-cellular 3D carbon microstructure according to an embodiment of the present invention are shown in FIGS. 4a and 4b. Here, the ordered open-cellular 3D carbon microstructure shown in FIGS. 4a and 4b is formed according to the method as described above with reference to FIG. 3 and is electrically conductive and needed no metallic coating for scanning electron micrographs.

Referring back to FIG. 1, a thermogravimetric analysis (TGA) was conducted on two samples to determine their respective mass loss when heated to 1000° C. in Argon. The temperature ramp rate was 10° C./minute. As shown in the TGA data in FIG. 1, virtually all of the polyurethane material was lost during carbonization; however, when the polyurethane was incorporated with polyacrylonitrile (through the method as described above), the mass loss at 1000° C. was approximately 50%.

In view of the foregoing, embodiments of the present invention provide ordered open-cellular carbon microstructures and/or methods for forming the ordered open-cellular carbon microstructures that can greatly improve the carbon yield (remaining mass % after carbonization) of open-cellular polymer materials.

While certain exemplary embodiments have been described in detail and shown in the accompanying drawings, it is to be understood that such embodiments are merely illustrative of and not restrictive of the broad invention. It will thus be recognized by a person skilled in the art that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims and equivalents thereof.

What is claimed is:

1. An ordered open-cellular carbon microstructure comprising:
    a plurality of first carbonized truss elements extending along a first direction;
    a plurality of second carbonized truss elements extending along a second direction; and
    a plurality of third carbonized truss elements extending along a third direction,
    wherein the first, second, and third carbonized truss elements interpenetrate each other at a plurality of nodes to form a continuous material, and
    wherein the ordered open-cellular carbon microstructure is self-supporting.

2. The ordered open-cellular carbon microstructure as set forth in claim 1, wherein the first, second, and third carbonized truss elements are defined by a plurality of polymer waveguides interconnected to each other as an ordered open-cellular polymer template.

3. The ordered open-cellular carbon microstructure as set forth in claim 1, wherein the continuous material substantially lacks interior boundaries.

4. The ordered open-cellular carbon microstructure as set forth in claim 1, wherein the first, second, and third carbonized truss elements are adapted to axially transfer a mechanical load applied to the ordered open-cellular carbon microstructure.

5. The ordered open-cellular carbon microstructure as set forth in claim 1, wherein the plurality of first carbonized truss elements, the plurality of second carbonized truss elements, and the plurality of third carbonized truss elements comprise a carbonized polyacrylonitrile (PAN) material.

6. The ordered open-cellular carbon microstructure as set forth in claim 1, wherein the plurality of first carbonized truss elements, the plurality of second carbonized truss elements, and the plurality of third carbonized truss elements comprise a carbonized copolymer of polyurethane.

* * * * *